United States Patent
Sequeira et al.

(10) Patent No.: US 10,152,690 B2
(45) Date of Patent: Dec. 11, 2018

(54) LOCATION AND TIME BASED SMART LABEL UPDATES FOR AUTO CURRENCY CONVERSION, SYMBOL AND ITEM LEVEL DESCRIPTION

(71) Applicants: Melwyn F. Sequeira, Plantation, FL (US); Hubert A. Patterson, Boca Raton, FL (US); Mohammad Mohiuddin, Boynton Beach, FL (US)

(72) Inventors: Melwyn F. Sequeira, Plantation, FL (US); Hubert A. Patterson, Boca Raton, FL (US); Mohammad Mohiuddin, Boynton Beach, FL (US)

(73) Assignee: Tyco Fire & Security GmbH, Neuhausen AM Rheinfall (CH)

( * ) Notice: Subject to any disclaimer, the term of this patent is extended or adjusted under 35 U.S.C. 154(b) by 227 days.

(21) Appl. No.: 15/398,365

(22) Filed: Jan. 4, 2017

(65) Prior Publication Data
US 2018/0189719 A1    Jul. 5, 2018

(51) Int. Cl.
*G06Q 10/08* (2012.01)
*G06K 19/07* (2006.01)
*G06K 19/077* (2006.01)

(52) U.S. Cl.
CPC ....... *G06Q 10/087* (2013.01); *G06K 19/0723* (2013.01); *G06K 19/07758* (2013.01)

(58) Field of Classification Search
CPC .................................................. G06Q 10/087
See application file for complete search history.

(56) References Cited

U.S. PATENT DOCUMENTS

| 4,962,466 A | 10/1990 | Revesz et al. | |
|---|---|---|---|
| 7,413,121 B2 | 8/2008 | Goel et al. | |
| 2003/0149557 A1* | 8/2003 | Cox | H04M 3/42229 704/2 |
| 2010/0030549 A1* | 2/2010 | Lee | G06F 1/1626 704/4 |
| 2010/0161311 A1* | 6/2010 | Massuh | G06F 17/3087 704/7 |
| 2011/0125486 A1* | 5/2011 | Jaiswal | G06F 17/289 704/3 |
| 2012/0005222 A1* | 1/2012 | Bhagwan | G06F 17/30389 707/769 |
| 2013/0085927 A1* | 4/2013 | Scott | G06Q 20/32 705/39 |

(Continued)

*Primary Examiner* — Scott A Zare
(74) *Attorney, Agent, or Firm* — Fox Rothschild LLP; Robert J. Sacco; Carol E. Thorstad-Forsyth

(57) ABSTRACT

Systems and methods for managing inventory pricing. The methods comprise: programming, at a first location, an Electronic Smart Tag ("EST") with at least first item level information comprising a first item description in a first language and a first item price in a first monetary currency; outputting the first item level information from the EST; and automatically replacing the first item level information being output from the EST with second item level information in response to the ESTs arrival at a second location different than and remote from the first location. The second item level information comprises the first item description in a second language different than the first language and the first item price in a second monetary currency different than the first monetary currency.

20 Claims, 6 Drawing Sheets

(56) References Cited

U.S. PATENT DOCUMENTS

| | | | |
|---|---|---|---|
| 2013/0174051 A1* | 7/2013 | Schatzberger | G06F 3/04842 715/748 |
| 2014/0280091 A1* | 9/2014 | Nasarov | G06F 17/30241 707/723 |
| 2015/0113034 A1* | 4/2015 | Tome | G06F 17/3089 709/201 |
| 2018/0182375 A1* | 6/2018 | Fomin | G06F 17/289 |

* cited by examiner

LOCATION AND TIME BASED SMART LABEL UPDATES FOR AUTO CURRENCY CONVERSION, SYMBOL AND ITEM LEVEL DESCRIPTION

BACKGROUND

Statement of the Technical Field

The present disclosure concerns generally to electronic inventory systems. More particularly, the present invention relates to implementing systems and methods for providing location and time based smart label updates for auto currency conversion, symbol and item level description.

Description of the Related Art

Electronic labels have been produced to automate shelf and item labeling processes in inventory systems. The electronic labels are designed to display item level information such as item descriptions, pricing, Stock Keeping Unit ("SKU") codes, and store promotional information. The electronic label displays comprise E Ink displays and/or Liquid Crystal Displays ("LCDs"). The electronic labels contain wireless radio technologies and are connected to an enterprise wireless communications network (e.g., a WiFi network and/or RFID network) via at least one access point (often located in the ceiling of a facility). Some systems also employ Infrared ("IR") based technology as a means of communicating with the electronic labels. The wireless radio and/or IR technology is used to provide the item level information to the electronic labels.

SUMMARY

The present invention concerns implementing systems and methods for managing inventory pricing. The methods comprise: programming, at a first location (e.g., the United States and/or a manufacturer's facility), an Electronic Smart Tag ("EST") with at least first item level information comprising a first item description in a first language and a first item price in a first monetary currency; outputting the first item level information from the EST; and automatically replacing the first item level information being output from the EST with second item level information in response to the ESTs arrival at a second location (e.g., Japan and/or a distributor's facility) different than and remote from the first location. The second item level information comprises the first item description in a second language different than the first language and the first item price in a second monetary currency different than the first monetary currency.

In some scenarios, the EST is caused to enter a first operational mode in which at least one operation of the EST is disabled (e.g., after the first information has been displayed in on the EST's display). The at least one operation is exclusive of item level information output operations. The EST is also caused to transition from the first operational mode to a second operational mode in which all functions of the EST are enabled, in response to the ESTs arrival at the second location.

In those or other scenarios, the automatically replacing comprises performing operations by the EST to: retrieve the second item level information from an internal memory; cease outputting of the first item level information; and start outputting the second item level information. Alternatively, the automatically replacing comprises: performing operations by a remote computing device to program the EST with the second item level information; and performing operations by the EST to cease outputting the first item level information and start outputting the second item level information.

In those or other scenarios, the automatically replacing comprises performing operations by the EST to: convert the language and monetary currency of the first item level information to generate the second item level information; cease outputting the first item level information; and start outputting the second item level information. The conversion may be performed by the remote computing device rather than the EST. In this case, the automatically replacing comprises: performing operations by a remote computing device to generate the second item level information by converting the language and monetary currency of the first item level information; and performing operations by the EST to cease outputting the first item level information and start outputting the second item level information.

In those or yet other scenarios, the EST performs operations to determine if a current date is a pre-selected sale date for an item to which the EST is attached. The second item level information being output from the EST is replaced with third item level information comprising at least one of a sale price and a promotional message, it if is determined that the current date is a pre-selected sale date.

BRIEF DESCRIPTION OF THE DRAWINGS

Embodiments will be described with reference to the following drawing figures, in which like numerals represent like items throughout the figures.

DETAILED DESCRIPTION

Figure 1:
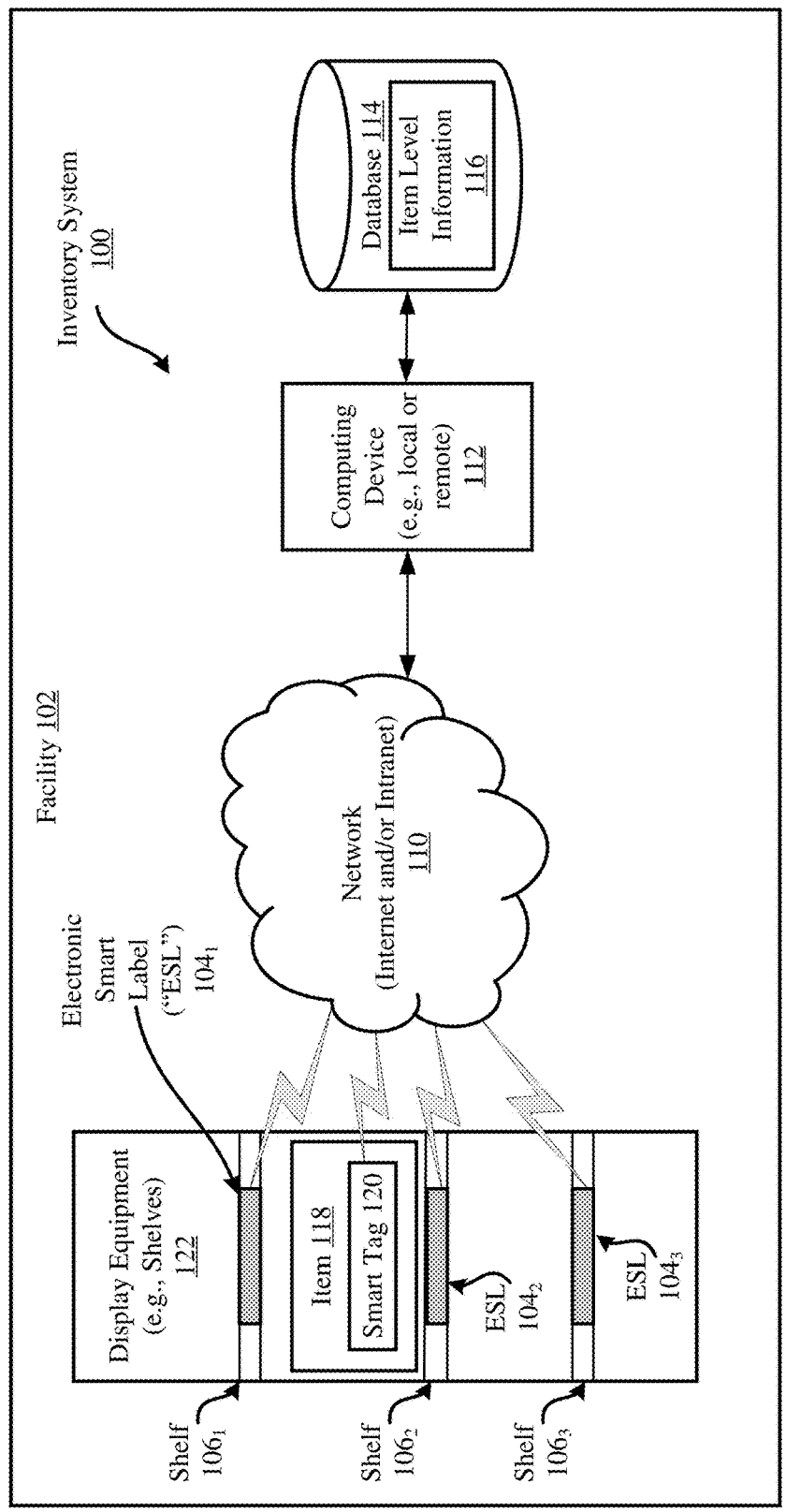
FIG. 1 is an illustration of an exemplary inventory system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Retailers have begun to deploy and test the viability of ESL based inventory systems in an effort to manage price, promotions and various other item level information. All this, to enable the enterprise to dynamically manage pricing based on demand, or otherwise push slow-moving inventory, while enhancing customer shopping experience and managing labor costs associated with manually managing the ESLs.

The present solution provides a way to automatically and dynamically update item level information of the Electronic Smart Tags ("ESTs") affixed to items (e.g., items offered for sale such as clothing) based on various trigger events. This solution allows merchants to bulk program item level information onto the ESTs at their distribution centers so that the ESTs comprise the proper pricing and item descriptions for a plurality of geographic locations (e.g., countries). In effect, the ESTs include item level information for use in a plurality of different countries. Accordingly, the item descriptions are provided to the ESTs in a plurality of different languages and item prices are provided in accordance with a plurality of monetary currencies. This information may be provided to the ESTs together at a single facility (e.g., a manufacturer's facility) or separately at different facilities (e.g., a manufacturer's facility, a distribution center and/or retail stores). When items tagged with the ESTs enter a new geographic location, the output item level information is automatically and dynamically modified so that item descriptions are presented in the particular language of the new geographic location and/or item prices are presented in accordance with the monetary currency of the new geographic location. Such ESTs provide an item inventorying solution with easier inventory management as compared to that of conventional inventorying techniques.

Referring now to FIG. 1, there is provided an illustration of an exemplary inventory system 100. Inventory system 100 is entirely or at least partially disposed within a facility 102. The facility 102 can include, but is not limited to, a manufacturer's facility, a distribution center facility, a retail store facility or other facility within a supply chain.

As shown in FIG. 1, at least one item 118 resides within the facility 102. The item 118 has an EST 120 coupled thereto. This coupling is achieved via an adhesive (e.g., glue), a mechanical coupler (e.g., straps, clamps, snaps, etc.), a weld, chemical bond or other means. The EST 120 is generally configured to provide a visual and/or auditory output of item level information. The item level information includes, but is not limited to, an item description, an item regular price, an item sale price, a currency symbol, and/or a source of the item. The EST 120 will be described in detail below in relation to FIG. 2. The item level information can be output in a format selected from a plurality of formats based on a geographic location of the item, a date, and/or an item pricing status (e.g., whether the item is on sale). In a display context, the format is defined by a font parameter, a color parameter, a brightness parameter, and/or a display blinking parameter. In an auditory context, the format is defined by a volume parameter, a voice tone parameter, and/or a male/female voice selection parameter.

The item 118 is disposed on display equipment 122. The display equipment includes, but is not limited to, shelves $106_1$-$106_3$, display cabinets, and/or exhibit cases. In the shelf scenario, each shelf $106_1$-$106_3$ may have an ESL affixed thereto. ESLs are well known in the art, and therefore will not be described herein. Still, it should be understood that the ESLs display information relating to the items stored on the respective shelves.

The EST 120 and ESLs $104_1$-$104_3$ comprise wireless communication components that enable the communication of item level information thereto and/or therefrom. The item level information is provided to the EST and ESLs from a computing device 112 via a network 110. The computing device 112 can be local to the facility 102 as shown in FIG. 1 or remote from the facility 102. The computing device 112 will be described in detail below. However, at this time, it should be understood that the computing device 112 is configured to: write data to and read data from a database 114, EST 120 and/or ESLs $104_1$-$104_3$; and/or perform language and currency conversion operations using item level information obtained from the database 114, EST 120 and/or ESLs $104_1$-$104_3$. The data can include, but is not limited to, item level information 116.

Figure 2:
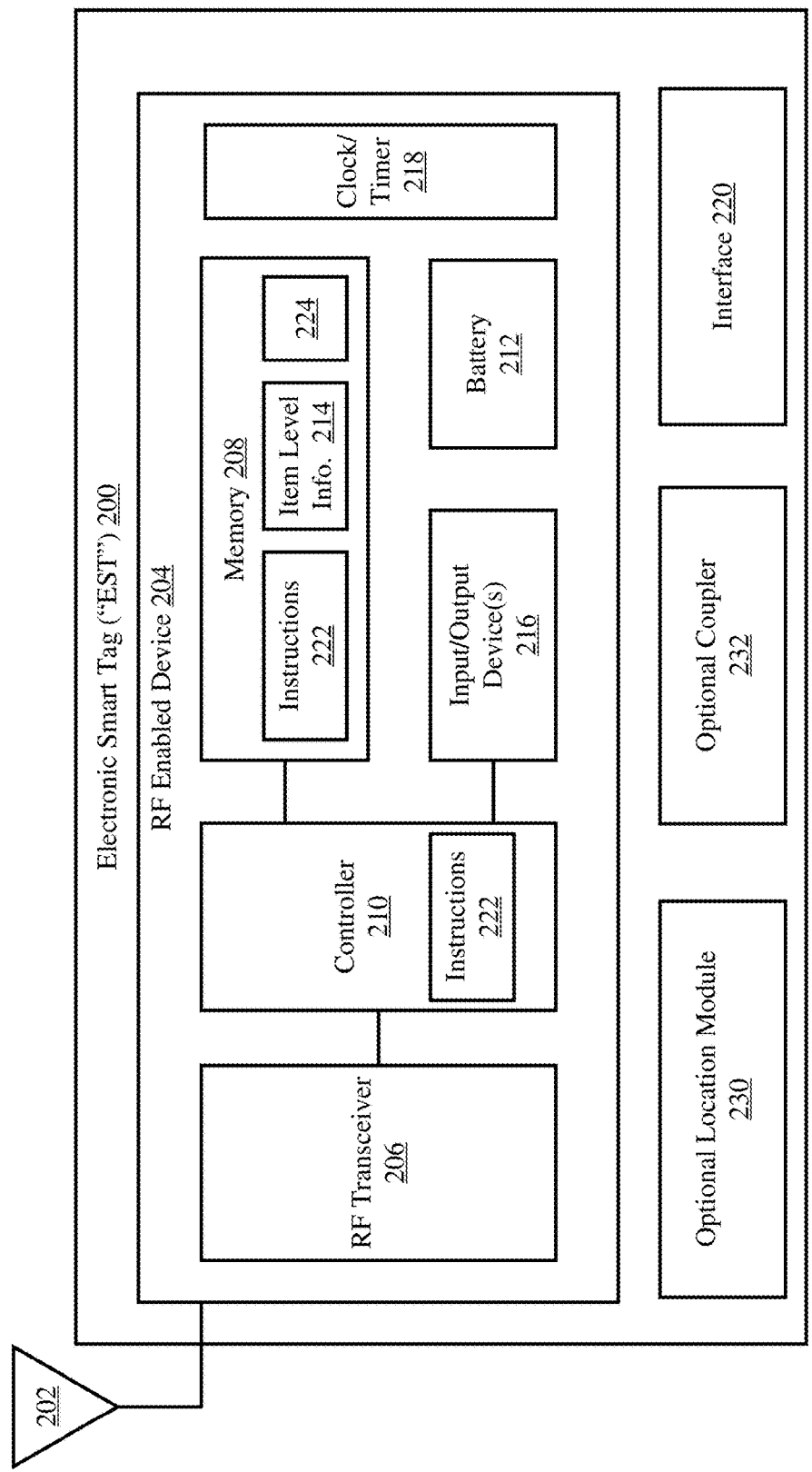
FIG. 2 is an illustration of an exemplary architecture for an EST.

Referring now to FIG. 2, there is provided an illustration of an exemplary architecture for an EST 200. EST 120 and/or ESLs $104_1$-$104_3$ of FIG. 1 is/are the same as or substantially similar to EST 200. As such, the discussion of EST 200 is sufficient for understanding the EST 120 and/or ESLs $104_1$-$104_3$ of FIG. 1.

The EST 200 can include more or less components than that shown in FIG. 2. However, the components shown are sufficient to disclose an illustrative embodiment implementing the present solution. Some or all of the components of the EST 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative EST 200 configured to facilitate improved inventory pricing management. In this regard, the EST 200 is configured for allowing data to be exchanged with an external device (e.g., computing device 112 of FIG. 1) via wireless communication technology. The wireless communication technology can include, but is not limited to, Radio Frequency ("RF") communication technology. RF communication technology is well known in the art, and therefore will not be described in detail herein. Any known or to be known RF communication technology or other wireless communication technology can be used herein without limitation.

The components 206-218 shown in FIG. 2 may be collectively referred to herein as the RFID enabled device 204, and include a power source 212 (e.g., a battery), a memory 208 and a clock/timer 218. Memory 208 may be a volatile memory and/or a non-volatile memory. For example, the memory 208 can include, but is not limited to, Random Access Memory ("RAM"), Dynamic RAM ("DRAM"), Static RAM ("SRAM"), Read Only Memory ("ROM") and flash memory. The memory 408 may also comprise unsecure memory and/or secure memory.

The RFID enabled device 204 comprises an antenna 202 for allowing data to be exchanged with the external device via RFID technology. The antenna 202 is configured to receive RFID signals from the external device and/or transmit RFID signals generated by the RFID enabled device 204. In some scenarios, the antenna 202 comprises a low-power near-field antenna. The low-power near-field antenna includes, but is not limited to, a chip antenna or a loop antenna.

The RFID enabled device 204 also comprises an RF transceiver 206. RF transceivers are well known in the art, and therefore will not be described herein. However, it should be understood that the RF transceiver 206 generates and transmits RF carrier signals to external devices, as well as receives RF signals transmitted from external devices. In this way, the RFID enabled device 204 facilitates the registration, identification, location and/or tracking of an item (e.g., item 118 of FIG. 1) to which the EST 200 is coupled. The RFID enabled device 204 also facilitates the automatic and dynamic modification of item level information that is being or is to be output from the EST 200 in response to certain trigger events. The trigger events can include, but are not limited to, the EST's arrival at a particular facility (e.g., facility 102 of FIG. 1), the EST's arrival in a particular country or geographic region, and/or a date occurrence.

Item level information 214 and/or other information 224 associated with the identification and/or location of the EST 200 can be stored in memory 208 of the RFID enabled device 204 and/or communicated to other external devices (e.g., computing device 112 of FIG. 1) via RF transceiver 206 and/or interface 220 (e.g., an Internet Protocol or cellular network interface). For example, the RFID enabled device 204 can communicate information specifying a timestamp, a unique identifier, item description, item price, a currency symbol and/or location information to an external computing device. The external computing device (e.g., server) can then store the information in a database (e.g., database 114 of FIG. 1) and/or use the information during language and/or currency conversion operations.

The RFID enabled device 204 also comprises a controller 210 and input/output devices 216. The controller 210 can also execute instructions 222 implementing methods for facilitating the management of item pricing. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, within the controller 210 during execution thereof by the EST 200. The memory 208 and the controller 210 also can constitute machine-readable media. The term "machine-readable media", as used here, refers to a single medium or multiple media (e.g., a centralized or distributed database, and/or associated caches and servers) that store the one or more sets of instructions 222. The term "machine-readable media", as used here, also refers to any medium that is capable of storing, encoding or carrying a set of instructions 222 for execution by the EST 200 and that cause the EST 200 to perform any one or more of the methodologies of the present disclosure.

The input/output devices can include, but are not limited to, a display (e.g., an E Ink display or LCD display), a speaker, a keypad and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the EST 200 and/or for notifying the person of a particular pricing status (e.g., on sale status) of the item to which the EST is coupled.

The EST 200 also comprises an optional location module 230. The location module 230 is generally configured to determine the geographic location of the EST at any given time. For example, in some scenarios, the location module 230 employs Global Positioning System ("GPS") technology and/or Internet based local time acquisition technology. The present solution is not limited to the particulars of this example. Any known or to be known technique for determining a geographic location can be used herein without limitation.

The clock/timer 218 is configured to determine a date, a time, and/or an expiration of a pre-defined period of time. Technique for determining these listed items are well known in the art, and therefore will not be described herein. Any known or to be known technique for determining these listed items can be used herein without limitation.

The optional coupler 232 is provided to securely or removably couple the EST 200 to an item (e.g., item 118 of FIG. 1). The coupler 232 includes, but is not limited to, a mechanical coupling means (e.g., a strap, clip, clamp, snap) and/or adhesive (e.g., glue or sticker). The coupler 232 is optional since the coupling can be achieved via a weld and/or chemical bond.

Figure 3:
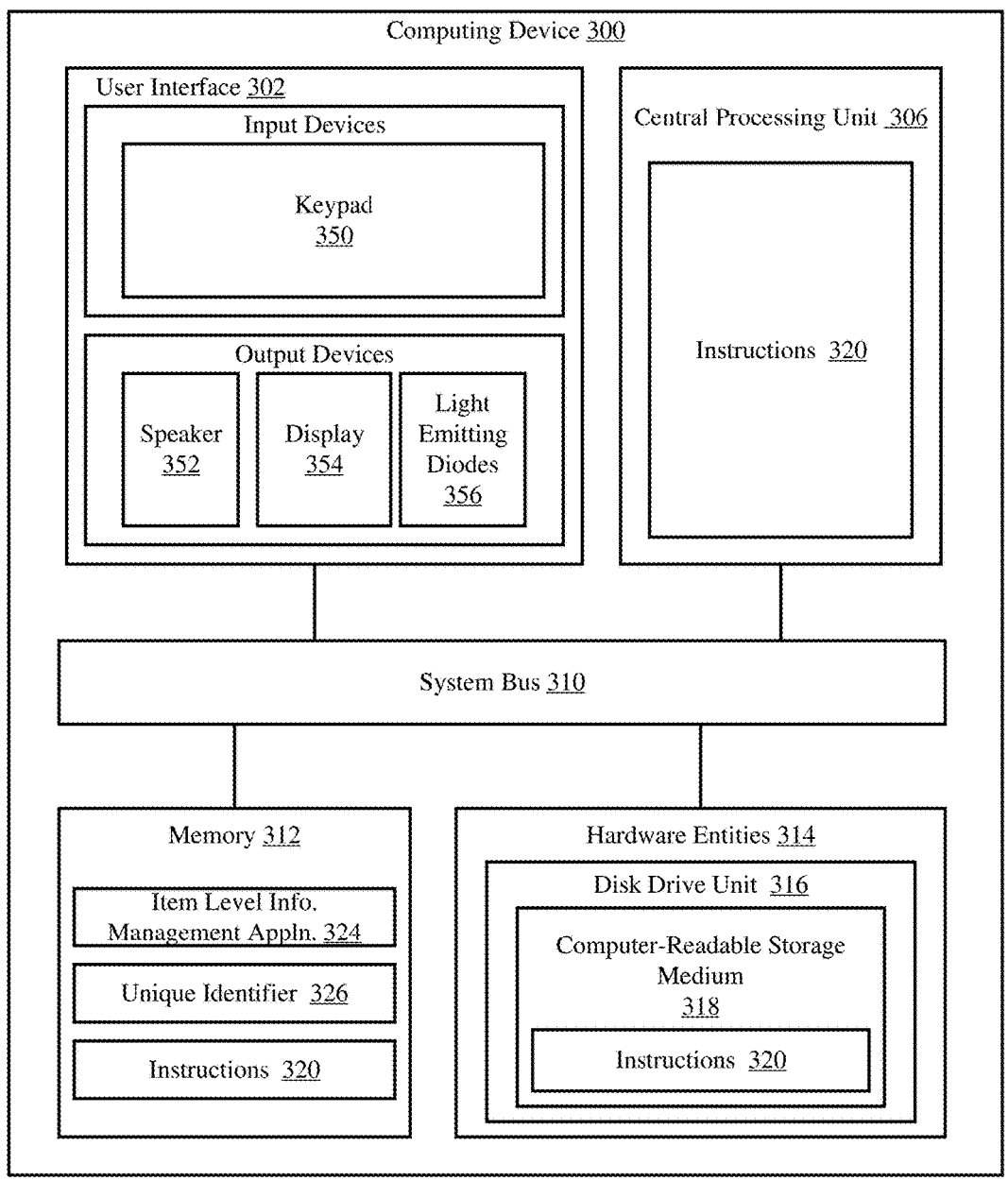
FIG. 3 is an illustration of an exemplary architecture for a computing device (e.g., a server).

Referring now to FIG. 3, there is provided a detailed block diagram of an exemplary architecture for a computing device 300. Computing device 112 of FIG. 1 is the same as or substantially similar to computing device 300. As such, the following discussion of computing device 300 is sufficient for understanding computing device 112.

Computing device 300 may include more or less components than those shown in FIG. 3. However, the components shown are sufficient to disclose an illustrative embodiment implementing the present solution. The hardware architecture of FIG. 3 represents one embodiment of a representative Computing device configured to facilitate improved inventory pricing management. As such, the computing device 300 of FIG. 3 implements at least a portion of a method for automatically and dynamically modifying item level information output from ESTs in accordance with the present solution.

Some or all the components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit ("CPU") 306, a system bus 310, a memory 312 connected to and accessible by other portions of computing device 300 through system bus 310, and hardware entities 314 connected to system bus 310. The user interface can include input devices (e.g., a keypad 350) and output devices (e.g., speaker 352, a display 354, and/or light emitting diodes 356), which facilitate user-software interactions for controlling operations of the computing device 300.

At least some of the hardware entities 314 perform actions involving access to and use of memory 312, which can be a RAM, a disk driver and/or a Compact Disc Read Only Memory ("CD-ROM"). Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

In some scenarios, the hardware entities 314 include an electronic circuit (e.g., a processor) programmed for facilitating the provision of item level information in a language and currency used in a given geographic location whereat or wherein an EST or ESL resides. In this regard, it should be understood that the electronic circuit can access and run an item level information management application 324 installed on the computing device 300. The software application 324 is generally operative to: obtain item level information and/or other information from ESTs and/or ESLs; program item level information onto ESTs and/or ESLs; convert the language, pricing and/or currency symbol of item level information; and/or facilitate registration of ESTs and/or ESLs with inventory systems. Other functions of the software application 324 will become apparent as the discussion progresses.

Referring now to FIG. 4, there is provided a flow diagram of an exemplary method 400 for managing item level information output from ESTs (e.g., EST 118 of FIG. 1). Method 400 begins with step 402 and continues with step 404 where at least one EST is programmed with at least first item level information at a first facility (e.g., a manufacturer's facility in a first country such as the United States). The first item level information includes, but is not limited to, a first item description expressed in a first language (e.g., English), a first item price in a first monetary currency (e.g., dollars), a first currency symbol (e.g., $), and/or graphics. The first item description can include, but is not limited to, an item name, an item weight, item size, item color, an item type identifier, and/or information indicating whether the item was grown organically or produced in a particular manner.

Figure 5:
FIG. 5 is an illustration of an exemplary EST displaying item level information.

The programmed first item level information is then visually and/or auditorily output from the EST via its output device(s) (e.g., output devices 216 of FIG. 2), as shown by 406. The visual output is achieved using a display (e.g., an E Ink display) of the EST, and/or the auditory output is achieved using a speaker of the EST. The first item level information can be output in a format selected from a plurality of formats based on a geographic location of the item, a date, and/or an item pricing status (e.g., whether the item is on sale). In a display context, the format is defined by a font parameter, a color parameter, a brightness parameter, and/or a display blinking parameter. An illustration of an exemplary EST displaying item level information is provided in FIG. 5. In an auditory context, the format is defined by a volume parameter, a voice tone parameter, and/or a male/female voice selection parameter.

Next in 408, the EST is caused to enter a first operational mode in which at least one operation of the EST is disabled for power saving purposes. The at least one operation is exclusive of item level information output operations. Accordingly, the EST continues to output the first item level information when it is in the first operational mode or power saving mode.

Figure 4A:
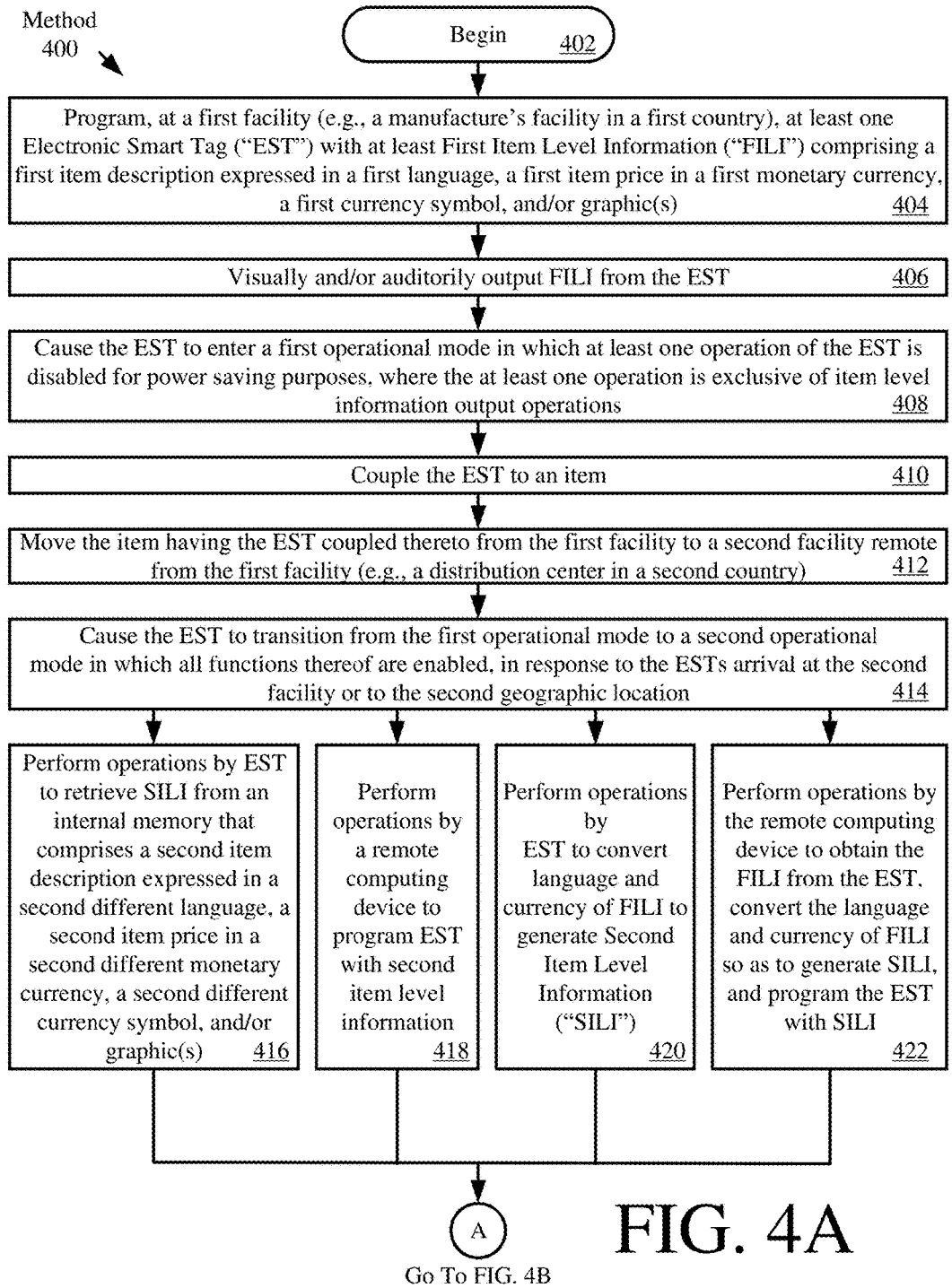
FIGS. 4A-4B (collectively referred to as "FIG. 4") provide a flow diagram of an exemplary method for managing inventory pricing.

The EST is coupled to an item (e.g., item 118 of FIG. 1) as shown by 410. Notably, the EST can be coupled to the item before or after it has been programmed with the first item level information. As such, the coupling of 410 can alternatively be performed prior to the operations of 404, rather than subsequent to the operations of 410 as shown in FIG. 4A.

Upon completing 410, the item is moved in 412 from the first facility (e.g., a manufacturer's facility in a first country such as the United States) to a second facility (e.g., a distributor's facility in a second country such as Japan) that is remote from the first facility. The first facility is located at a first geographic location (e.g., California, United States). The second facility is located at a second geographic location (e.g., Tokyo, Japan). The second geographic location may be in a different country than the country in which the first facility resides.

As is known, different countries can employ different languages and different monetary currencies. Thus, the item level information needs to be modified to reflect these differences such that the item level information is output from the ESL in the language and currency of the second geographic location. The process of converting language and currency has traditionally been quite cumbersome especially when dealing with relatively large inventories. Accordingly, the present solution is designed to address this drawback of conventional inventory systems. In this regard, method 400 continues with 414-426 where an automatic process is performed to dynamically change the language and currency of the item level information. 414-426 are discussed below. In 414-426, the conventional inventory system requirement for the duplication of merchandise handling is eliminated. Also, the present solution provides a process that saves time and manual labor as compared to that of conventional inventory systems.

In response to the EST's arrival to the second geographic location (e.g., second country) and/or at the second facility, the EST is caused in 414 to transition from the first operational mode to a second operational mode in which all functions thereof are enabled. In this regard, it should be noted that the EST is configured to register with a local inventory system and/or obtain its corresponding geo location. Techniques for device registration are well known in the art, and therefore will not be described herein. Any known or to be known device registration technique can be used herein without limitation. The geo location can be obtained using Global Positioning System ("GPS") technology, local Internet/Intranet connectivity technology, and/or Internet based local time technology. The operational mode transition can be triggered by the EST's registration with the local inventory system and/or the EST's determination that the obtained geo location matches geo location information stored in its internal memory (e.g., memory 208 of FIG. 2).

Subsequently, operations are performed to obtain by the EST and/or to provide to the EST second item level information in one of 416, 418, 420 and 422. In 416, the EST performs operations to retrieve the second item level information from its internal memory (e.g., memory 208 of FIG. 2). The second item level information includes, but is not limited to, a second item description expressed in a second different language, a second item price in a second different monetary currency, a second different currency symbol, and/or graphic(s). In this case, the EST was pre-programmed with the second item level information at the first facility (e.g., a manufacturer's facility in a first country such as the United States).

Alternatively in 418, a remote computing device (e.g., computing device 112 of FIG. 1) performs operations to program the EST with the second item level information at the second facility. In this case, the EST previously registered with the inventory system (e.g., inventory system 100 of FIG. 1) upon its arrival at the second facility as discussed above and/or paired with an SRC device of the inventory system.

In other scenarios, the EST performs operations in 420 to convert the language and/or currency of the first item level information to generate the second item level information. Methods for converting languages and currencies are well known in the art, and therefore will not be described herein. Any known method for language and/or currency conversion can be used herein without limitation.

In yet other scenarios, this conversion is performed by the remote computing device. Accordingly, 422 involves performing operations by the remote computing device to: obtain the first item level information from the EST; convert the language and currency of the first item level information so as to generate second item level information; and program the EST with the second item level information.

Figure 4B:
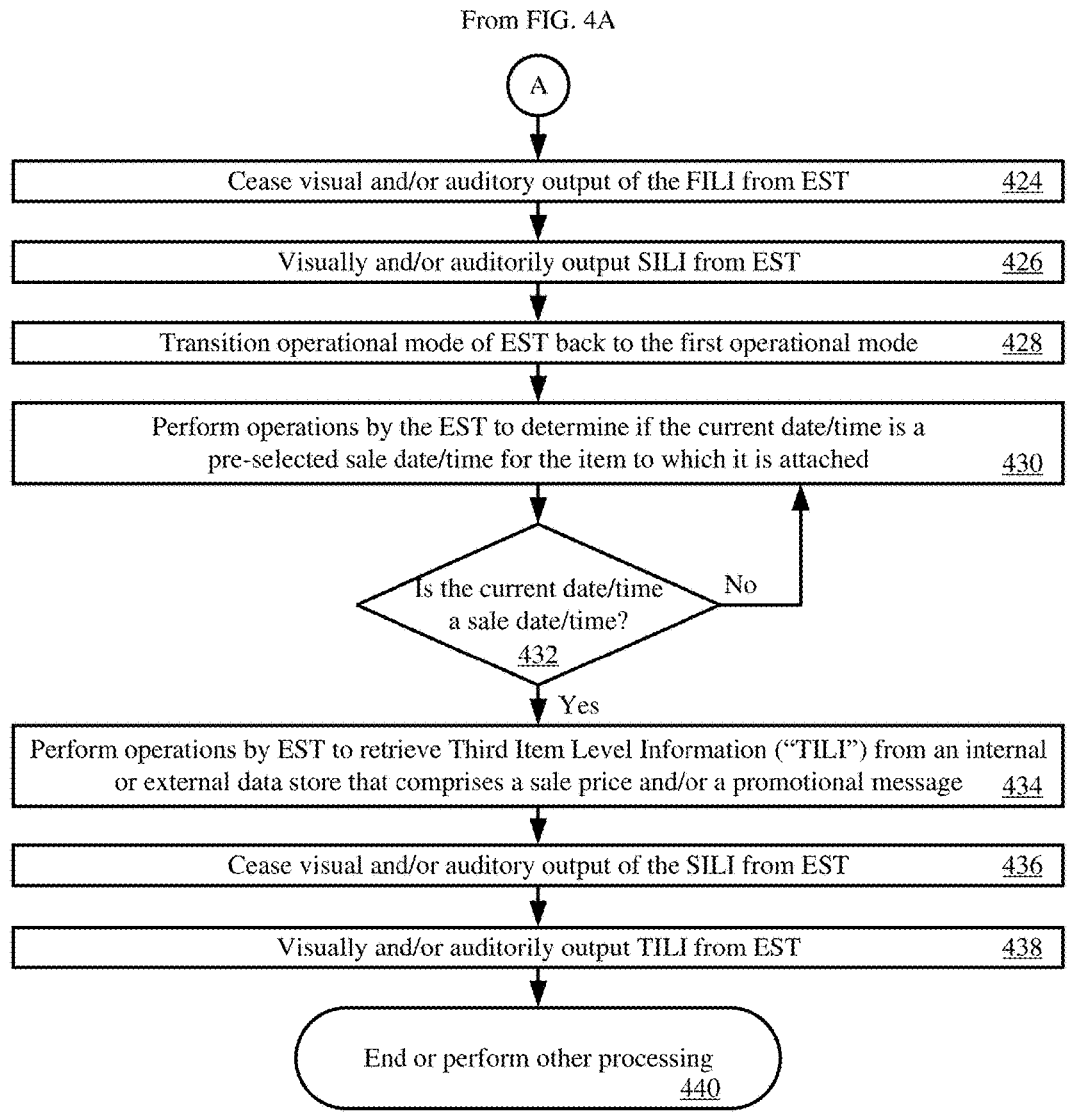

After completing 416, 418, 420 or 422, method 400 continues with 424 of FIG. 4B. As shown in FIG. 4B, 424 involves ceasing the visual and/or auditory output of the first item level information from the EST. Next in 426, the second item level information is output from the ESL in a visual and/or auditory manner. The operational mode of the EST is then transitioned back to its first operational mode (or power save mode) in 428.

In the first operational mode, the EST may perform operations to keep track of the date and/or time. As such, method 400 comprises 430-436 in which the EST performs operations to: determine if the current date/time is a pre-selected sale date/time (e.g., Black Friday) for the item to which it is attached; and replace the displayed second item level information with third item level information if the current date/time is a pre-selected sale date/time. The pre-selected sale date/time can be obtained from an internal memory (e.g., memory 208 of FIG. 1) or an external data store (e.g., database 114 of FIG. 1). A comparison of the current date/time to the pre-selected sale date/time is performed to make the determination as to whether or not the current date/time is a pre-selected sale date/time. The current date/time is deemed to be a sale date/time when it matches the pre-selected sale date/time. The third item level information includes, but is not limited to, a sale price and/or a promotional message. Upon completing 436, 440 is performed where method 400 ends or other processing is performed.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method for managing inventory pricing, comprising:
    programming, at a first location, an Electronic Smart Tag ("EST") with at least first item level information comprising a first item description in a first language and a first item price in a first monetary currency;
    outputting the first item level information from the EST; and
    automatically replacing the first item level information being output from the EST with second item level information in response to the EST's arrival at a second location different than and remote from the first location, the second item level information comprising the first item description converted into a second language different than the first language and the first item price converted into a second monetary currency different than the first monetary currency.

2. The method according to claim 1, wherein the first location is in a first country and the second location is in a second different country.

3. The method according to claim 1, further comprising causing the EST to enter a first operational mode in which at least one operation of the EST is disabled, where the at least one operation is exclusive of item level information output operations.

4. The method according to claim 3, further comprising causing the EST to transition from the first operational mode to a second operational mode in which all functions of the EST are enabled, in response to the ESTs arrival at the second location.

5. The method according to claim 1, wherein the automatically replacing comprises performing operations by the EST to:
    retrieve the second item level information from an internal memory;
    cease outputting of the first item level information; and
    start outputting the second item level information.

6. The method according to claim 1, wherein the automatically replacing comprises:
    performing operations by a remote computing device to program the EST with the second item level information; and performing operations by the EST to cease outputting the first item level information and start outputting the second item level information.

7. The method according to claim 1, wherein the automatically replacing comprises performing operations by the EST to:
convert the language and monetary currency of the first item level information to generate the second item level information;
cease outputting the first item level information; and
start outputting the second item level information.

8. The method according to claim 1, wherein the automatically replacing comprises:
performing operations by a remote computing device to generate the second item level information by converting the language and monetary currency of the first item level information; and
performing operations by the EST to cease outputting the first item level information and start outputting the second item level information.

9. The method according to claim 1, further comprising performing operations by the EST to determine if a current date is a pre-selected sale date for an item to which the EST is attached.

10. The method according to claim 9, further comprising performing operations by the EST to replace the second item level information being output therefrom with third item level information comprising at least one of a sale price and a promotional message, it if is determined that the current date is a pre-selected sale date.

11. An Electronic Smart Tag ("EST"), comprising:
a processor; and
a computer-readable storage medium comprising programming instructions that are configured to cause the processor to implement a method for managing inventory, wherein the programming instructions comprise instructions to:
receive, from a first device located at a first location, at least first item level information comprising a first item description in a first language and a first item price in a first monetary currency;
output the first item level information; and
automatically replace the first item level information being output with second item level information in response to the EST's arrival at a second location different than and remote from the first location, the second item level information comprising the first item description converted into a second language different than the first language and the first item price converted into a second monetary currency different than the first monetary currency.

12. The EST according to claim 11, wherein the first location is in a first country and the second location is in a second different country.

13. The EST according to claim 11, wherein the programming instructions further comprise instructions to cause the EST to enter a first operational mode in which at least one operation of the EST is disabled, where the at least one operation is exclusive of item level information output operations.

14. The EST according to claim 13, wherein the programming instructions further comprise instructions to cause the EST to transition from the first operational mode to a second operational mode in which all functions of the EST are enabled, in response to the ESTs arrival at the second location.

15. The EST according to claim 11, wherein the first item information is automatically replaced with the second item level information by:
retrieving the second item level information from an internal memory of the EST;
ceasing the output of the first item level information from the EST; and
starting to output the second item level information from the EST.

16. The EST according to claim 11, wherein the first item level information is automatically replaced with the second item level information by:
receiving second item level information from a remote computing device;
ceasing the output of the first item level information from the EST; and
starting to output the second item level information from the EST.

17. The EST according to claim 11, wherein the first item level information is automatically replaced with the second item level information by:
converting the language and monetary currency of the first item level information to generate the second item level information;
ceasing the output of the first item level information from the EST; and
starting to output the second item level information from the EST.

18. The EST according to claim 11, wherein the first item level information is automatically replaced with the second item level information by:
receiving the second item level information which was generated by a remote computing device via a conversion of the language and monetary currency of the first item level information;
ceasing the output of the first item level information from the EST; and
starting to output the second item level information from the EST.

19. The EST according to claim 11, wherein the programming instructions further comprise instructions to determine if a current date is a pre-selected sale date for an item to which the EST is attached.

20. The EST according to claim 19, wherein the programming instructions further comprise instructions to replace the second item level information being output from the EST with third item level information comprising at least one of a sale price and a promotional message, it if is determined that the current date is a pre-selected sale date.

* * * * *